S. T. LEWIS.
CHUCK.
APPLICATION FILED JAN. 18, 1911.

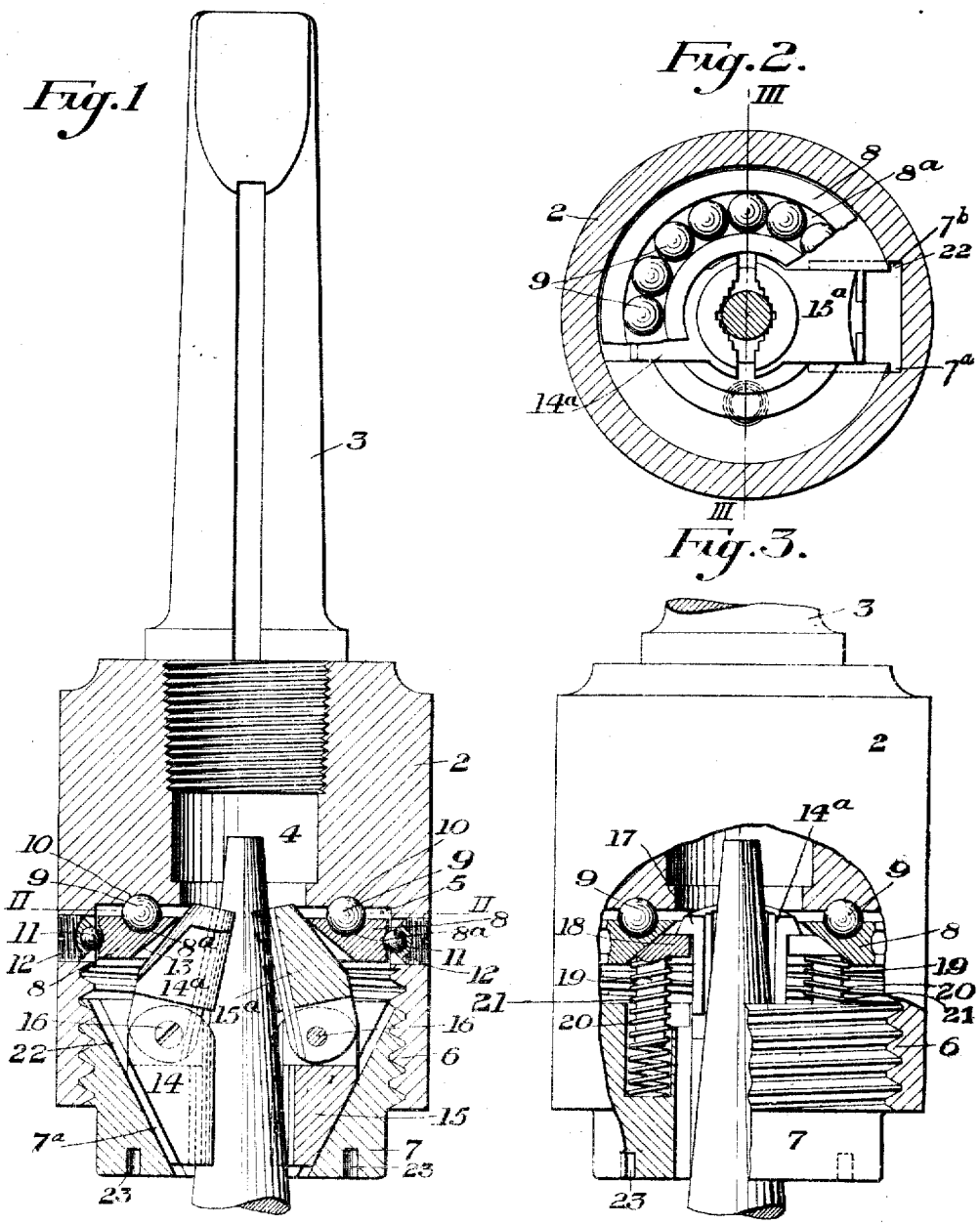

1,011,975.

Patented Dec. 19, 1911.
2 SHEETS—SHEET 2.

WITNESSES
R. S. Little
M. P. Alexander

INVENTOR
Sherman T. Lewis
by Luthman, Belt & Fuller
his Attorneys

UNITED STATES PATENT OFFICE.

SHERMAN T. LEWIS, OF SWISSVALE, PENNSYLVANIA.

CHUCK.

1,011,975. Specification of Letters Patent. Patented Dec. 19, 1911.

Application filed January 18, 1911. Serial No. 603,369.

*To all whom it may concern:*

Be it known that I, SHERMAN T. LEWIS, of Swissvale, in the county of Allegheny and State of Pennsylvania, have invented a new and useful Improvement in Chucks, of which the following is a full, clear, and exact description, reference being had to the accompanying drawings, forming part of this specification.

My invention relates to chucks for holding drills, bits and other articles, in a machine tool such as a lathe or drill press, and the invention more particularly relates to chucks for holding drills of various cross sectional shapes.

One object of this invention is to provide a chuck having novel gripping means by which drills or other articles of various cross sections are securely held in place while drilling or boring with the drill or bit.

Another object of this invention is to provide a chuck having improved means for gripping and holding articles in the chuck and for tightening the gripping jaws by which such articles are held in the chuck.

Figure 5:
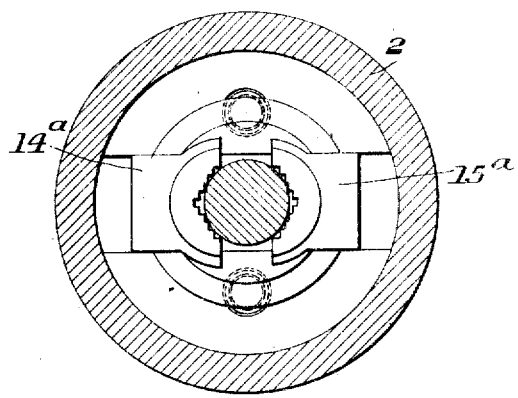
Figure 7:
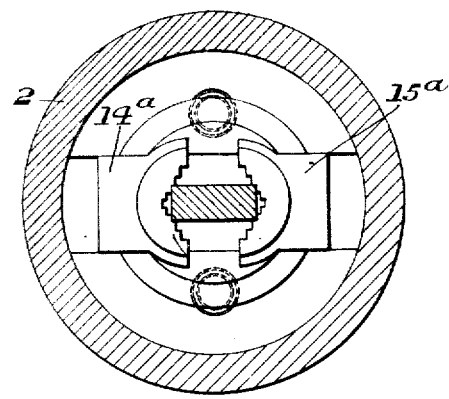
Figure 4:
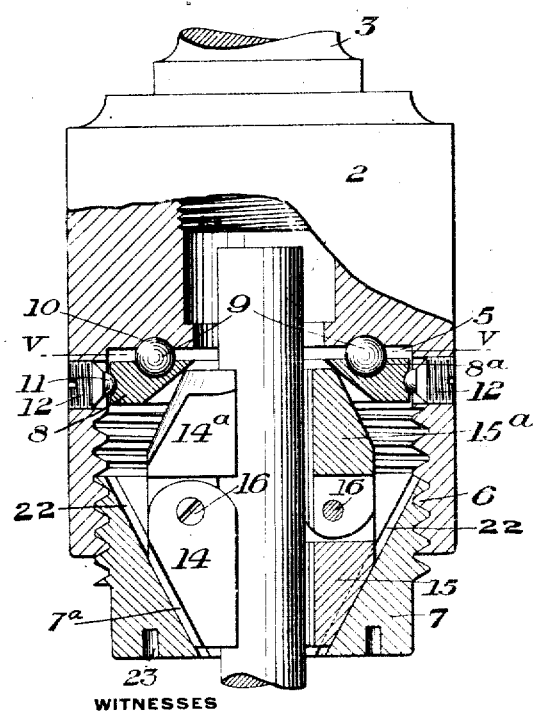
Figure 6:
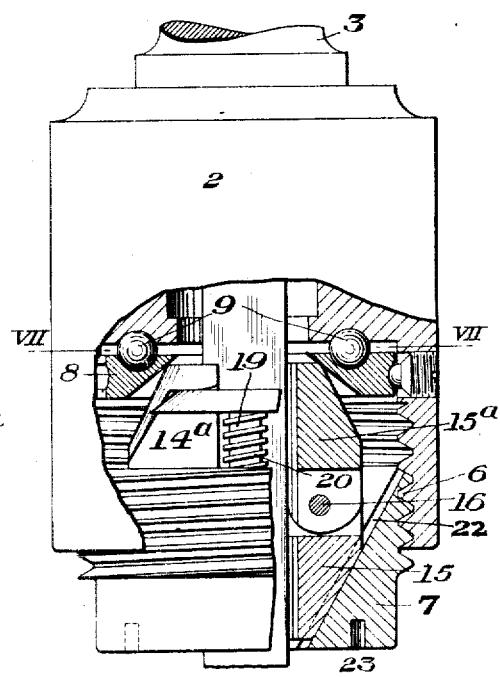

In the accompanying drawings, Figure 1 is a longitudinal section showing the arrangement and construction of the parts forming the chuck, the tapering shank of a drill being grasped by the tapering jaws. Fig. 2 is a transverse section of the same taken on the line II—II of Fig. 1. Fig. 3 is an elevation partly in section taken on the line III—III of Fig. 2. Fig. 4 is a side elevation partly in section showing the gripping jaws of the chuck in holding engagement with the cylindrical shank of a drill or other article. Fig. 5 is a transverse section of the same taken on the line V—V of Fig. 4. Fig. 6 is a side elevation partly in section showing the construction of the gripping jaws and the means employed for actuating these jaws to grasp and hold articles placed between the jaws. Fig. 7 is a transverse section of the same taken on the line VII—VII of Fig. 6.

Referring to the drawings, 2 designates a sleeve having a central longitudinal opening or recess therein. The sleeve as shown is provided with internal screw threads at one end which engage with the threaded end of the shank 3. This shank is made to the standard Morse taper, so as to fit the spindle sockets of machine tools. The sleeve 2 is provided with a central longitudinal opening 4 having a counterbore 5, and the outer end of the counterbore 5 is provided with internal screw threads 6 into which a threaded tightening nut 7 is screwed.

Detachably secured within the counterbore 5 is a ring 8 having an annular V-shaped groove 8ª on one face which forms one ball race for the balls 9 of an anti-friction bearing. The inner end of the counterbore 5 is also provided with an annular V-shaped groove 10 which registers with the annular groove 8ª in the race ring 8, and forms the opposing race for the balls 9. A peripheral groove is also provided in the ring 8 into which the balls 11 extend, these balls being held in position by the screws 12 which are cupped or recessed on their inner ends to form a seat for the balls 11. The annular ring 8 is provided with a beveled bore 13 and this ring constitutes a seat for a purpose described hereinafter.

The tightening nut 7 is provided with a central tapering opening into which one end of the clamping jaws of the chuck extend. As shown, each clamping jaw is made in two parts, 14 and 14ª, 15 and 15ª, which are hinged together, being held in engagement with each other by the screws 16. The upper ends of the jaw members 14ª, 15ª, are provided with a shoulder or lug 17 which engages with the semi-annular flange 18 on one end of the pins 19, these pins being inserted in openings or holes 20 in the end of the nut 7. A helical spring 21 surrounding each pin 19 engages with the flange portions 18 of these pins 19 and with the bottom of the openings 20 so as to move the pin outwardly in the opening 20 and by engagement with the shoulder or flange 17 on the jaw members 14ª, 15ª, to extend these jaw members and hold them stationary when the nut 7 is screwed outwardly in the counterbore 5 to release the shank of a drill or other article held between the gripping jaws. The jaw members 14 and 15 are provided with flanges or ribs 22 which engage with the rabbets or grooves, 7ª, 7ᵇ, provided in the opening through the nut 7, these grooves extending parallel to the face of this opening in the nut.

In using my improved chuck, the parts are assembled as shown, the nut 7 being screwed outwardly in the counterbore 5. When the nut is screwed outwardly, the springs 20 surrounding the pins 19 will cause the shoulder 18 to press against the flange or shoulder 17 on the upper end of the gripping jaw members 14ᵃ, 15ᵃ, and hold the tapering outer surface of these members in engagement with the surface of the tapering opening in the annular ring 8. As the nut 7 moves outwardly the lower gripping jaw members 14 and 15, by reason of the flanges 22, moving in the rabbets 7ᵃ, 7ᵇ, in the nut 7, will cause the jaws 14 and 15 to be moved away from each other so as to release the tool or other articles held between the gripping jaws.

It will be noted that in Figs. 1, 2 and 3, a tapering article is held between the gripping jaws while in Figs. 4 and 5 a cylindrical article is so held, and in Figs. 6 and 7 a drill shank or other article of rectangular cross section is shown in engagement with the gripping jaws.

When it is desired to secure a drill or other article in the chuck, the article is placed between the opposite gripping jaws and the nut 7 screwed into the counterbore so as to cause the opposing gripping jaws to grasp and hold a drill placed between them. To facilitate this tightening operation, openings 23 are provided in the outer face of the nut into which the pins of a spanner wrench are inserted during the tightening operation. The construction and operation of such spanners being old and well known need not be further described. When the shank of a drill or other article is placed between the gripping jaws, the nut 7 is then rotated so as to advance this nut into the counterbore 5 of the chuck. As the nut is rotated the gripping jaws are also rotated about the axis of the chuck and the tapering surfaces at the back of the jaw members 14, 14ᵃ, 15, 15ᵃ, engage respectively with the annular ring 8 of the anti-friction bearing and with the inner surface of the annular nut 7. By engagement of these inclined faces the gripping jaws are forced inwardly tightly into engagement with the article being grasped. The two members of each jaw being hinged together at their adjoining ends, a relative movement takes place so that articles of various cross sections can be readily grasped by the opposite jaws, whether cylindrical or tapering, or of other cross section, as will be seen by reference to Figs. 1, 4, 6 and 7. As the nut is turned in tightening the jaws, the anti-friction bearing formed by the balls 9 and the ring 8 will rotate so as to reduce the friction to a minimum and to cause the jaws to tightly grasp the article held between them. It should be noted that, as shown, it is only necessary to tighten the nut 7 sufficiently to hold the drill shank or other article held between the jaws with force enough to prevent it falling out by its own weight, and that after the drill or other article is so grasped, the machine tool to which the chuck is applied can be started in operation, as the direction of rotation of the parts is such that the greater the force put upon the chuck by the drill-press or lathe, the greater will be the force with which the article is grasped by the jaws. The effect of the turning operations of the machine tool in which the chuck is mounted is to effect a greater tightening effect upon the gripping jaws.

When it is desired to remove an article held between the jaws of the chuck, a spanner wrench is employed to retract the nut 7 in the counterbore 5 and by reason of the anti-friction bearing in the bottom of the counterbore this is readily accomplished, resistance to release being greatly reduced by the employment of this anti-friction bearing.

The advantages of my invention will be apparent to those skilled in the art. The employment of the anti-friction bearing which coöperates with the gripping jaws, reduces the force necessary to release the jaws, while the gripping effect of the jaws is increased, due to the reduction in friction in tightening the jaws on the article being held. By making the jaws in sections and hinging the sections together as shown, drills of various shapes and sizes can be operated with the same chuck and drills of various cross sections can be securely held by the one chuck, giving a greater range for which such chucks are adapted for use.

The chuck as shown is not limited to use with a drilling machine, but is equally applicable to lathes and other turning tools.

Modifications in the construction and arrangement of the parts may be made without departing from my invention as defined in the claims.

I claim:—

1. A chuck comprising a sleeve, a rotatable tapered seat within the sleeve, a tubular nut, and jaws having a connection with the nut to rotate therewith and provided with portions slidably engaging the tapered portion of the seat, said jaw portions being out of contact with the sleeve, substantially as described.

2. A chuck comprising a sleeve, a rotatable seat within the sleeve, a tubular nut, and jaws rotatable with the nut and engaging the seat, the engaged portions of the seat and the jaws being relatively shaped to wedge the jaws toward one another when moved against the seat by the nut, the jaws being out of contact with the sleeve, substantially as described.

3. A chuck comprising a sleeve, a seat within the sleeve and provided with a tapered bore, a tubular nut provided with an internal tapered portion, and a plurality of jaws rotatable with the nut, each jaw including pivotally connected parts, one part having a beveled portion engaging the beveled portion of the seat, and the other part having a beveled portion engaging the beveled portion of the nut, substantially as described.

4. A chuck comprising an internally threaded sleeve, a seat, a tubular nut engaging the threaded part of the sleeve and provided with an internal tapered portion, jaws having slidable connections with the nut, said jaws projecting beyond the inner end of the nut, said seat being provided with a tapered portion against which the projecting portions of the jaws slidably engage to draw the jaws toward one another when the nut is moved into the sleeve, substantially as described.

5. A chuck comprising a threaded sleeve, a nut engaging the threaded part of the sleeve and having a tapered bore provided with longitudinal guideways therein, a plurality of jaws, each jaw including pivotally connected parts, one part having a tapered portion provided with a rib engaging one of the guideways, the other jaw part projecting beyond the inner end of the nut and provided with a beveled portion, and a seat in the sleeve provided with a tapered bore slidably engaged by the tapered portions of the projecting jaws, substantially as described.

6. A chuck comprising an internally threaded sleeve, a rotatable seat within the sleeve and in the form of a ring having a tapered bore, an anti-friction bearing between the ring and the sleeve, a tubular nut fitted to the threaded part of the sleeve and provided with a tapered bore, and jaws carried internally by the nut and rotatable therewith, each jaw including pivotally connected parts, one part having a tapered portion provided with a slidable connection with the tapered bore of the nut, and the other part projecting beyond the inner end of the nut and having a tapered portion engaging the tapered bore of the seat, substantially as described.

7. A chuck comprising a sleeve, a tubular nut carried thereby, a seat within the sleeve, jaws carried by the nut and engaging the seat, the engaging portions of the seat and jaws being relatively tapered to move the jaws inwardly toward one another when crowded against the seat by the nut, and a spring bearing against the nut and each jaw, substantially as described.

8. A chuck comprising a threaded sleeve, a tubular nut engaging the threaded part of the sleeve, a seat within the sleeve having a tapered portion, jaws carried by the nut and engaging the tapered seat portion, the engaging portions of the seat and the jaws being relatively tapered to force the jaws inwardly toward one another when crowded against the seat by the nut, shouldered pins slidable in openings in the nut, each jaw having a shoulder engaging the shoulder of one of the pins, and springs surrounding the pins and bearing against the nut and the shoulders of the respective pins, substantially as described.

9. A chuck comprising a threaded sleeve, a tubular nut engaging the threaded part of the sleeve and having a tapered bore, a seat within the sleeve having a tapered bore, jaws carried by the nut, each jaw including two pivotally connected parts, one part having a tapered portion engaging the beveled bore of the nut, the other part having a tapered portion engaging the beveled bore of the seat, shouldered pins slidable in openings in the nut, the part of each jaw which engages the seat having a shoulder engaged with the shoulder of one of the pins, and springs surrounding the pins and bearing against the nut and the shoulders of the respective pins, substantially as described.

In testimony whereof, I have hereunto set my hand.

SHERMAN T. LEWIS.

Witnesses:
G. E. F. GRAY,
F. A. POWER.